United States Patent [19]

Tanaka et al.

[11] Patent Number: 5,256,922

[45] Date of Patent: Oct. 26, 1993

[54] SPINDLE MOTOR

[75] Inventors: Tadahiro Tanaka, Ina; Hiroyuki Yonei; Yoichi Mori, both of Shiga; Yoshiyuki Kodaira, Takamori, all of Japan

[73] Assignee: Nippon Densan Corporation, Kyoto, Japan

[21] Appl. No.: 865,086

[22] Filed: Apr. 8, 1992

[30] Foreign Application Priority Data

Apr. 12, 1991 [JP] Japan .................. 3-108383

[51] Int. Cl.⁵ .................. H02K 11/00; H02K 7/14
[52] U.S. Cl. .................. 310/71; 310/67 R; 310/DIG. 6
[58] Field of Search ............ 310/40 MM, 67 R, 68 R, 310/71, 90, DIG. 6; 360/98.07, 99.04, 99.08

[56] References Cited

U.S. PATENT DOCUMENTS

| | | | |
|---|---|---|---|
| 4,275,426 | 6/1981 | Hoffman | 360/99.04 |
| 4,628,384 | 12/1986 | Raj et al. | 360/99.08 |
| 4,922,406 | 5/1990 | Schuh | 360/98.07 |
| 4,931,679 | 6/1990 | Fournier | 310/71 |
| 5,023,734 | 6/1991 | Tamaki | 310/71 |
| 5,132,856 | 7/1992 | Takahashi | 360/99.08 |
| 5,138,209 | 8/1992 | Chuta et al. | 310/71 |
| 5,173,628 | 12/1992 | Yoshida et al. | 310/71 |
| 5,177,650 | 1/1993 | Jabbari et al. | 360/99.08 |

FOREIGN PATENT DOCUMENTS

| | | | |
|---|---|---|---|
| 0209033 | 11/1984 | Japan | 310/68 R |
| 0022269 | 1/1987 | Japan | 360/99.08 |
| 9001231 | 2/1990 | World Int. Prop. O. | 360/98.07 |

Primary Examiner—Steven L. Stephan
Assistant Examiner—C. LaBalle
Attorney, Agent, or Firm—McCormick, Paulding & Huber

[57] ABSTRACT

A spindle motor comprises a housing, a hub arranged for rotation on the housing, a couple of bearings interposed between the housing and the hub, a rotor magnet mounted to the hub, and a stator mounted to the housing so as to face the rotor magnet, in which at least one of the two bearings is of single seal type having a seal at one side. Also, a flexible pc film is provided for supply of electric energy to the stator and arranged for improved connection to an armature coil of the stator.

8 Claims, 7 Drawing Sheets

SPINDLE MOTOR

FIELD OF THE INVENTION

The present invention relates to a spindle motor for rotation of a recording medium such as a magnetic disk.

DESCRIPTION OF THE PRIOR ART

In common, a spindle motor for rotation of a magnetic disk comprises a housing provided for installation onto the chassis of a disk drive apparatus, a hub rotatably mounted by a pair of bearings to the housing, a rotor magnet mounted to the hub, and a stator arranged opposite to the rotor magnet. The magnetic disk is installed onto the hub of the spindle motor by a known manner.

Such spindle motors have been decreased in size and now have become compact. There are still great demands for the spindle motors to minimize its vertical length or height. It is known for satisfying the demands to have the bearings decreased in size and/or shorten the distance between the two bearings. This will however result in declination of the rigidity of a motor construction causing a short operating life.

Such a spindle motor has an armature coil of its stator coupled electrically to a flexible pc (printed circuit) film installed in the housing. The smaller the motor becomes, the more difficult is a task for connection between the armature coil and the flexible pc film. Also, completion of the task will take a considerable amount of time.

SUMMARY OF THE INVENTION

It is an object of the present invention to provide a spindle motor which is effectively minimized in overall height while maintaining its substantial rigidity.

It is another object of the present invention to provide a spindle motor in which a flexible printed circuit film can electrically be connected to an armature coil with much ease during fabrication.

Other objects and advantages of the present invention will be apparent from the following description.

DETAILED DESCRIPTION OF THE PREFERRED EMBODIMENTS

The present invention will be described in more detail referring the accompanying drawings.

First Embodiment

Figure 1:
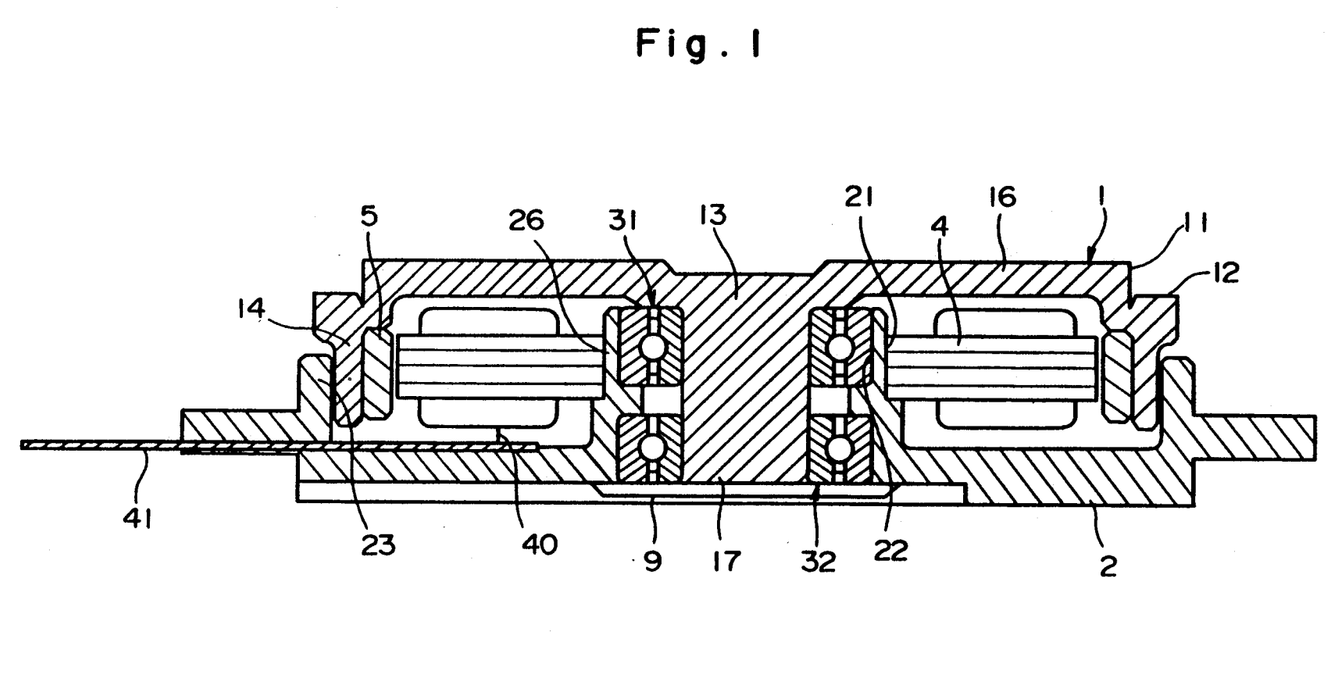
FIG. 1 is a cross sectional view of a spindle motor showing a first embodiment of the present invention.
Figure 2:
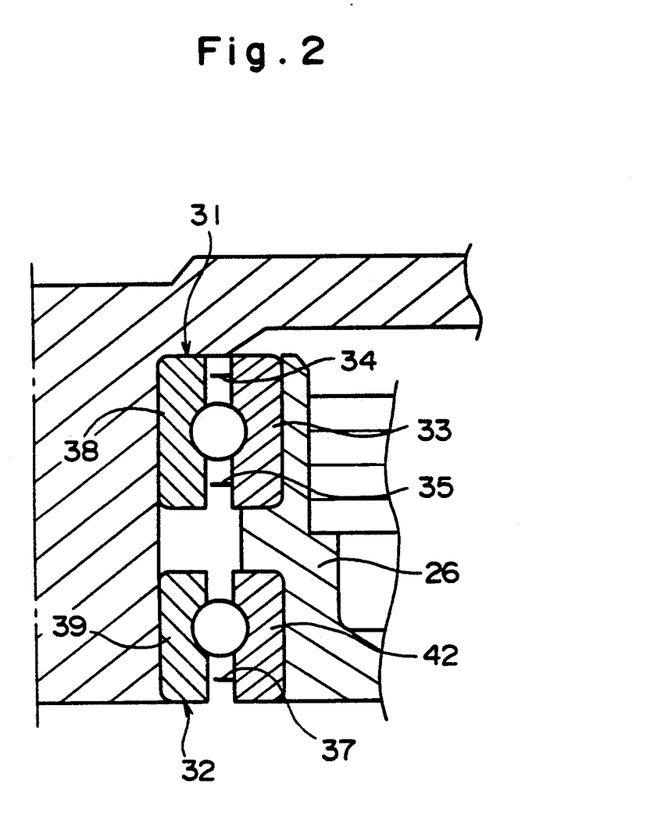
FIG. 2 is a partially enlarged cross sectional view of the spindle motor of the first embodiment shown in FIG. 1.

A spindle motor according to a first embodiment of the present invention is shown in FIGS. 1 and 2.

As shown in FIG. 1, a hub 1 of the spindle motor is consisted mainly of a hub body 16 and a shaft 17 both formed integrally of a metal material, e.g. aluminum or stainless steel. Hence, the spindle motor becomes compact in the overall size and improved in the rotating accuracy about a center axis. The hub body 16 and the shaft 17 may be prepared separately and coupled to each other by means of press fitting.

A rotor magnet 5 is mounted to the inner circumferential wall of the hub body 16 of the hub 1 so as to come opposite to a stator 4. The stator 4 is fixedly mounted to the outer side 21 of a center tubular support 26 of a housing 2. More specifically, the shaft 17 of the hub 1 is rotatably supported by two, upper and lower, bearings 31,32 fixedly mounted to the inner side 22 of the center tubular support 26 of the housing 2 so that the rotor magnet 5 can rotate relative to or about the stator 4. The housing 2 of the motor is mounted to a chassis (not shown) of a disk drive apparatus.

The stator 4 has a coil lead 40 connected to a printed circuit film 41 which is bonded to the inner surface of the housing 2 and extends at outward end to the outside of the spindle motor. The hub 1 also has at rim edge a flange 12 on which a recording medium, e.g. a magnetic disk, not shown is placed.

As best shown in FIG. 2, the upper bearing 31 for rotatably supporting the hub 1 is of double seal type having two seals 34 and 35 at both sides. The lower bearing 32 is of single seal type having a seal 37 at lower or outer side. More particularly, the two seals 34,35 are secured at one end to an outer ring 33 of the bearing 31 and extend at the other end towards an inner ring 38 of the same. Similarly, the seal 37 of the lower bearing 32 is secured at one end to an outer ring 42 and extends at the other end towards an inner ring 39.

Accordingly, the upper or disk chamber side of an intermediate between the two bearings 31,32 is protected with the two seals 34,35 of the upper bearing 31. The lower or outer side of the intermediate is protected with the seal 37 of the lower bearing 32 and a bearing cover cap 9. Lubricant, e.g. grease oil, filled in the bearings 31,32 will thus be prevented from leaking and spilling out to foul the interior or exterior of the spindle motor. The lower bearing 32 of single seal type is smaller in width so that the overall height or thickness of the spindle motor can be decreased. The presence of the seals of the bearings 31,32 will hardly affect the rigidity of the motor construction. The seals 34,35,37 may be formed of synthetic rubber materials.

In the spindle motor of the first embodiment, a further arrangement is provided for preventing the lubricant or grease in the bearings 31,32 from leaking and fouling an upward space or disk chamber where the magnetic disks are accommodated. The housing 2 is protected at bottom with the bearing cover cap 9 bonded thereto by an adhesive and thus, downward leakage and spilling out of the lubricant from the bearings will be averted. The bearing cover cap 9 is arranged for sealing off the interior of the spindle motor thus producing airtightness. As the result, no communication between the interior of the spindle motor and the disk chamber will be provided allowing no lubricant of the bearings 31,32 to leak and spill out. Also, the airtightness is enhanced by a labyrinth construction arranged with the inner wall of an annular rib 23 of the housing 2 and the outer wall of a downwardly extending rim 14 of the hub 1.

As described above, the spindle motor of the first embodiment allows one of the two bearings or namely, the lower bearing 32 to be equipped with no inner seal and can thus be reduced in the width with its operating characteristics remaining unchanged.

In the first embodiment, the lower bearing 32 is arranged smaller in the width by not using an inner (or upper) seal. However, the upper bearing 31 rather than the lower bearing 32 may be reduced in width by removing its lower seal 35 for the purpose. For further reduction in the height of the spindle motor, the lower seal 35 of the upper bearing 31 will be removed while the lower bearing 32 is equipped with no inner (or upper) seal. Nevertheless, the remaining two outer seals 34,37 of their respective bearings 31,32 are still capable of preventing leakage and spilling out of lubricant.

Second Embodiment

A second embodiment of the present invention will now be described referring to FIGS. 3 to 6.

Figure 3:
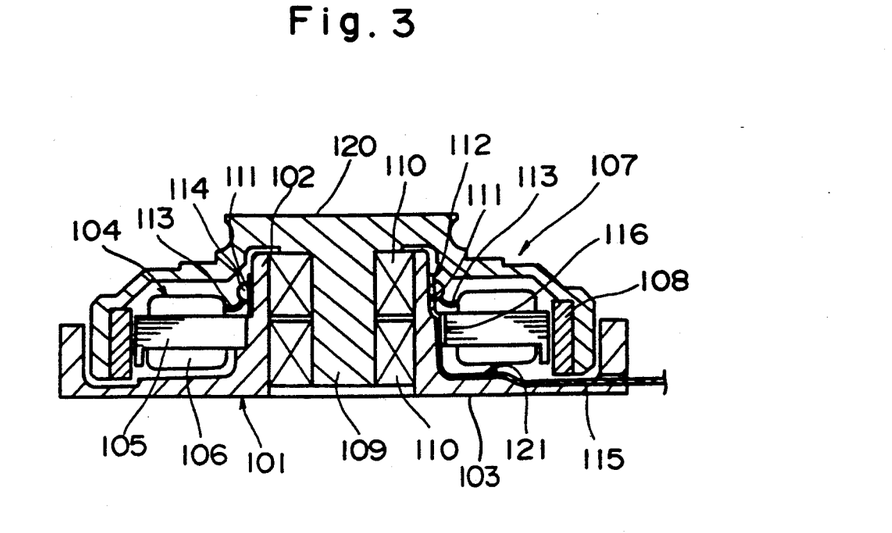
FIG. 3 is a cross sectional view of a spindle motor showing a second embodiment of the present invention.
Figure 4:
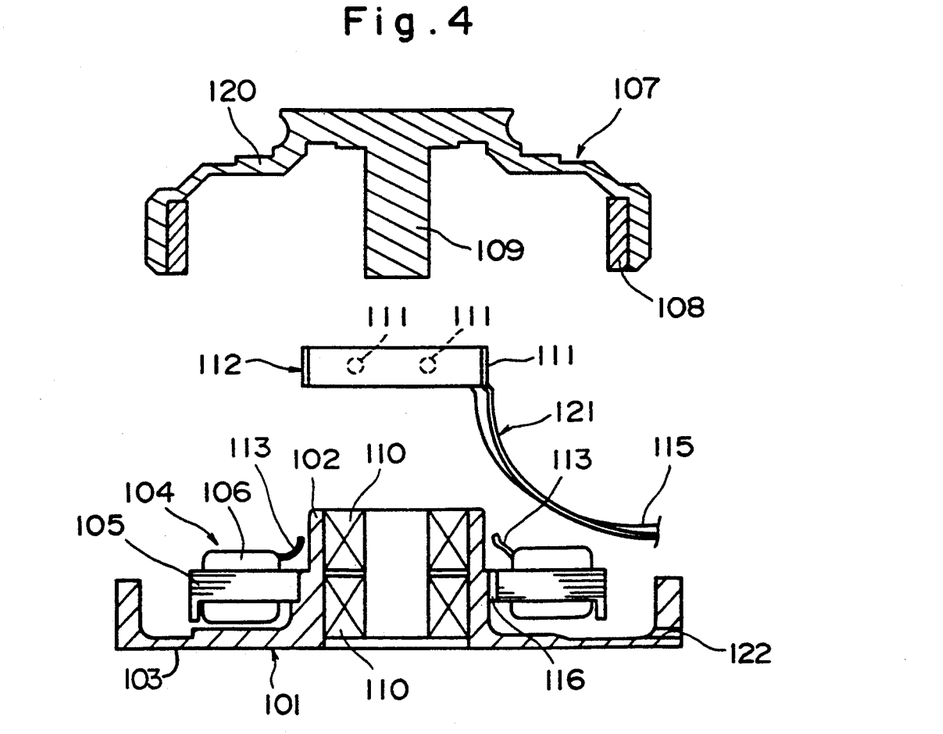
FIG. 4 is a partially exploded cross sectional view of the spindle motor of the second embodiment shown in FIG. 3.

A spindle motor illustrated in FIGS. 3 and 4 has a housing 101 for installation to a disk drive apparatus. The housing 101 comprises a base body 103 of disk-like shape and a tubular support 102 extending upward from the base body 103. Also, a stator 104 is mounted to the outer side of the tubular support 102, which comprises a stator core 105 and an armature coil 106 wound on the stator core 105.

A hub 107 is rotatably supported by a pair of bearings 110,110 fitted into the tubular support 102 of the housing 101. The hub 107 comprises a hub body 120 and a shaft 109 arranged integrally in the center of the hub body 120. More specifically, the shaft 109 of the hub 107 extends downward from and at a right angle to the hub body 120. The hub 107 is arranged to be loaded with a recording medium, e.g. a magnetic disk.

A rotor magnet 108 of annular shape is mounted to the inner wall of a rim portion of the hub body 120. The rotor magnet 108 is arranged about and opposite to the stator 104 so that the hub 107 (carrying the rotor magnet 108) can rotate in a given direction on the housing 101 (with the stator 104).

Figure 5:
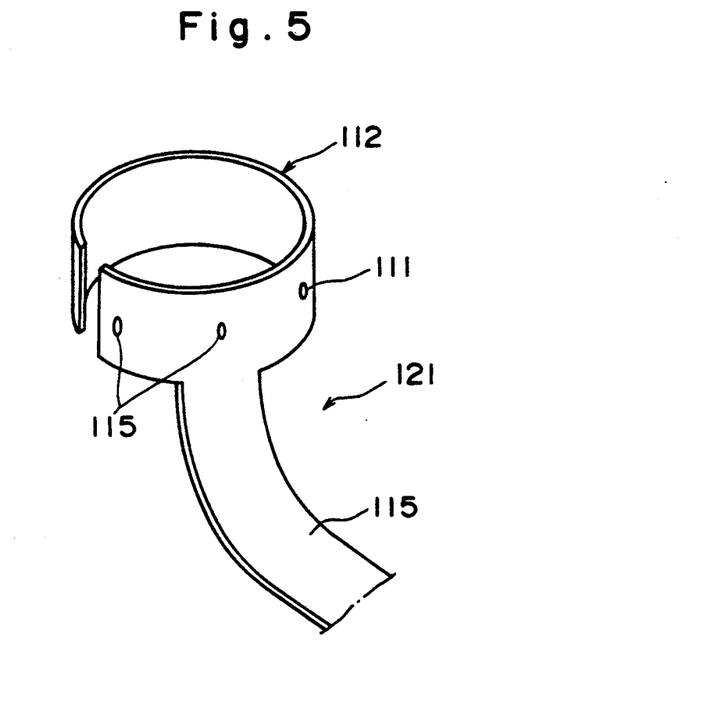
FIG. 5 is an enlarged perspective view of a flexible pc film of the spindle motor of the second embodiment shown in FIG. 3.
Figure 6:
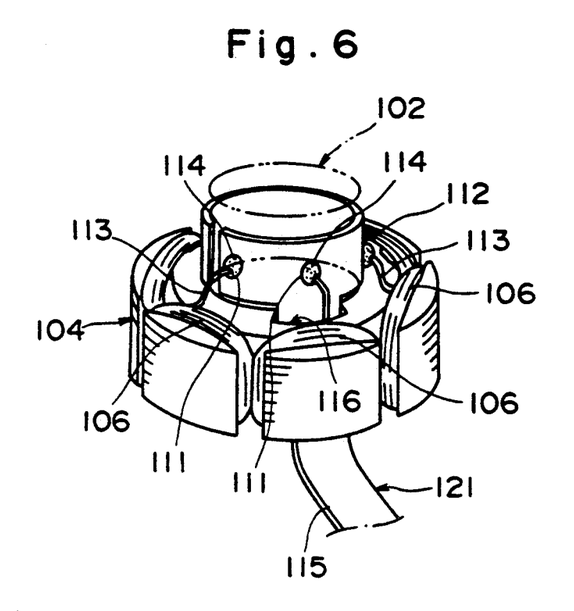
FIG. 6 is a perspective view showing a stator and its relevant arrangement of the spindle motor of the second embodiment shown in FIG. 3.

The armature coil 106 of the stator 104 is connected to a flexible pc film 121 which comprises a land portion 112 of belt-like form and a lead portion 115 extending from the land portion 112. As best shown in FIGS. 5 and 6, the land portion 112 of the flexible pc film 121 is bonded to the outer side of the tubular support 102 of the housing 101 so that it can extend around the tubular support 102 and above the stator 104. In more particular, the land portion 112 is fitted in a ring-like shape onto the tubular support 102 of the housing 101. The land portion 112 has three soldering contacts 111 arranged thereon circumferentially at equal intervals.

Each soldering contact 111 is electrically connected to the armature coil 106 by a lead line 113 which is coupled by e.g. a solder 114 to the contact 111.

The stator core 105 is formed of a plurality of core plates in layer arrangement and has an axially extending recess 116 arranged in the inner wall thereof. The recess 116 provides a clearance between the stator core 105 and the tubular support 102 of the housing 101. Hence, the lead portion 115 of the flexible pc film 121 can pass across the recess 116 and extend through a slot 122 (See FIG. 4) provided in the housing 101 to the outside, as shown in FIG. 3 or 6. Preferably, the lead portion 115 is bonded by e.g. an adhesive to the inner surface of the housing 101.

The flexible pc film 121 comprises a base film made of an insulating, resilient material, a resilient cover film, and a copper sheet sandwiched between the base film and the cover film. The three soldering contacts 111 of the land portion 112 are formed through removing corresponding regions of the cover film to expose the copper sheet.

The second embodiment permits the land portion 112 of the flexible pc film 121 to be disposed above the stator 104 (at the side opposite to the housing 101). Accordingly, during fabrication, the armature coil 106 of the stator 104 can be connected to the soldering contacts 111 of the flexible pc film 121 with much ease because there is wide opened above the stator 104 (prior to mounting of the hub 107).

Third Embodiment

Figure 7:
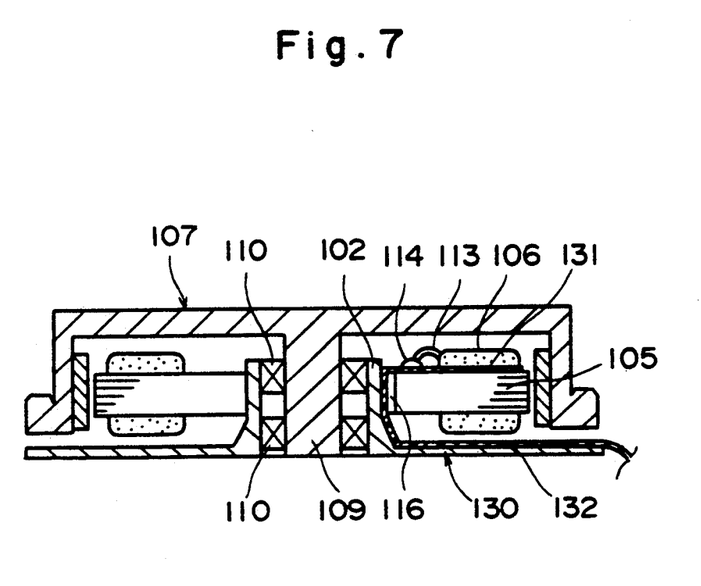
FIG. 7 is a cross sectional view of a spindle motor showing a third embodiment of the present invention.
Figure 8:
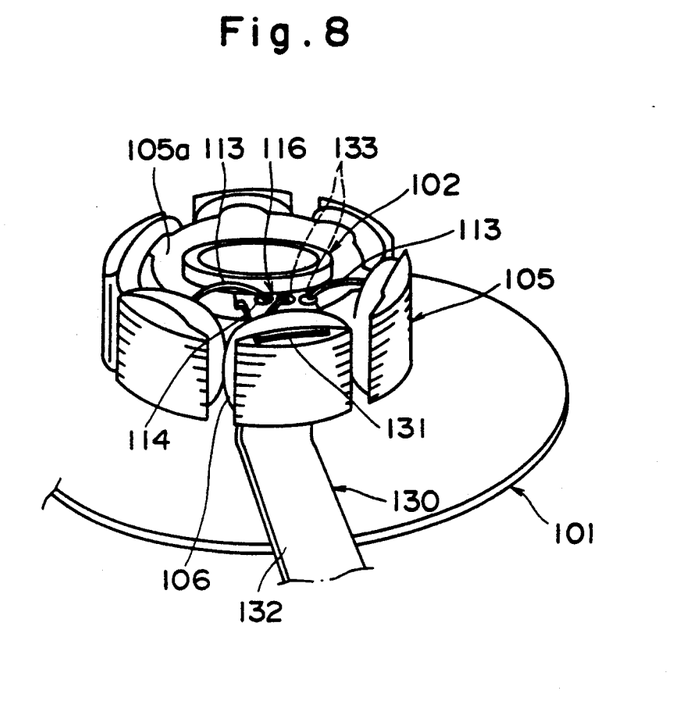
FIG. 8 is a perspective view showing a stator and its relevant arrangement of the spindle motor of the third embodiment shown in FIG. 7.

FIGS. 7 and 8 illustrate a spindle motor according to a third embodiment of the present invention, in which like components are represented by like numbers as of the second embodiment.

As shown, a flexible pc film 130 of the third embodiment comprises a land portion 131 and a lead portion 132 which both are substantially the same in width. More specifically, the land portion 131 is provided above the stator 104 and secured at inward end between the stator core 105 and the armature coil 106 by winding a coil wire in a known manner. The land portion 131 has wiring contacts 133 thereof provided above the upper surface of an annular proximal portion 105a of the stator core 105. Each contact 133 is then connected to the armature coil 106 by a lead line 113 which is welded by e.g. a solder 114 to the contact 133. The land portion 131 of the flexible pc film 130 may fixedly be bonded to the upper surface of the stator 104 by an adhesive rather than secured between the armature coil 106 and the stator 104.

The lead portion 132 of the flexible pc film 130 extends through a recess 116 provided in the stator core 105, which is similar to that of the second embodiment, and across a clearance between the housing 101 and the hub 107 to the outside, as shown in FIG. 7.

The land portion 131 of the flexible pc film 130 extends radially from the proximal end of the stator core 105 and its wiring contacts 133, three in this embodiment, are arranged at equal intervals on the inner side of the armature coil 106, as shown in FIG. 8. Accordingly, the armature coil 106 of the stator 104 can be connected to the wiring contacts 133 of the flexible pc film 130 with much ease because there is wide opened above the stator 104 (prior to mounting of the hub 107).

The other components and their arrangement of the third embodiments are similar to those of the second embodiment and will no more be explained.

Fourth Embodiment

Figure 9:
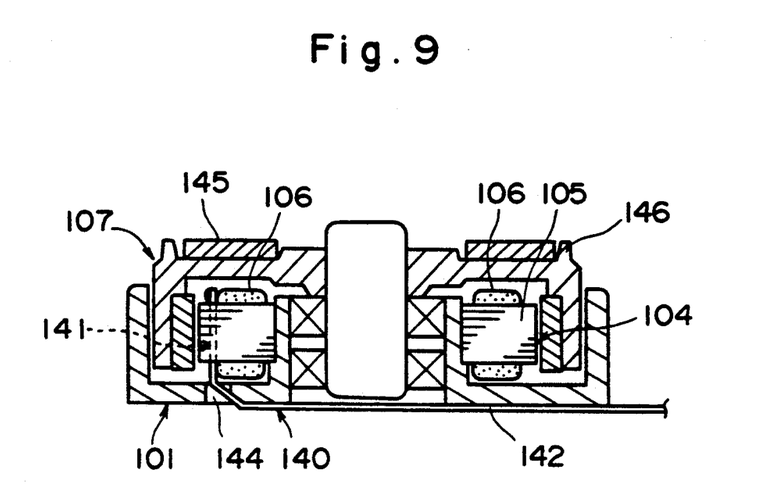
FIG. 9 is a cross sectional view of a spindle motor showing a fourth embodiment of the present invention.
Figure 10:
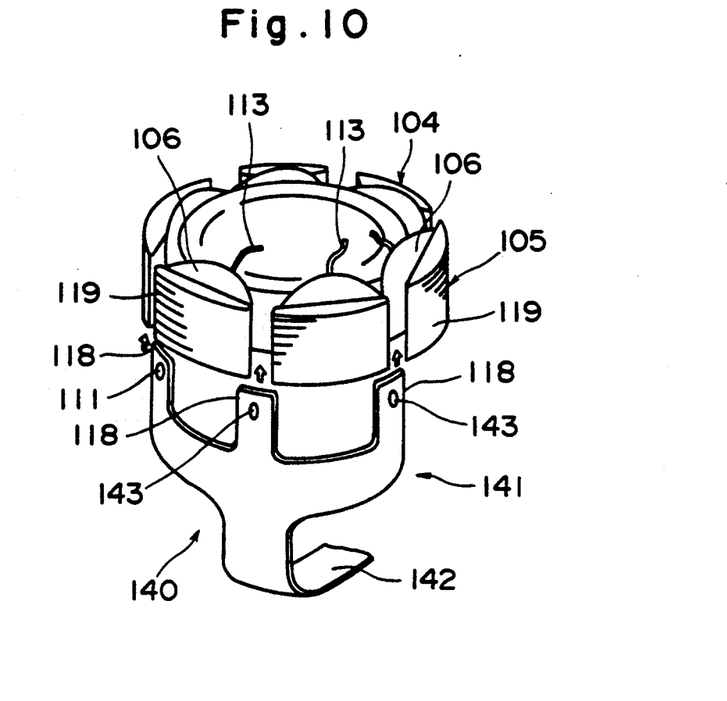
FIG. 10 is a partially exploded perspective view showing a stator and its relevant arrangement of the spindle motor of the fourth embodiment shown in FIG. 9.
Figure 11:
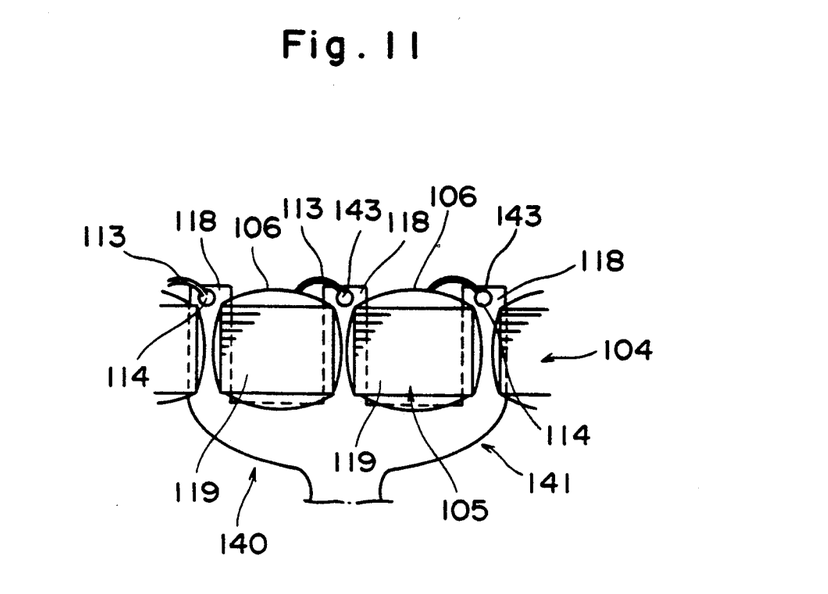
FIG. 11 is a front view showing the stator and its relevant arrangement of the same.

FIGS. 9 to 11 illustrate a spindle motor according to a fourth embodiment of the present invention, which is arranged for rotation of an optical disk.

As shown, a flexible pc film 140 of the fourth embodiment comprises a land portion 141 and a lead portion 142 extending from the land portion 141. The land portion 141 has at distal end three branches 118 thereof inserted into corresponding slots of the stator core 105 (defined by tooth portions 119 of the stator core 105) for fastening. The three branches 118 of the land portion 141 are neatly held in their respective slots so that it can remain well insulated. As shown in FIG. 11, the distal end of each branch 118 is projected upward from the top of the stator 104 and provided with a contact 143 for wire bonding. The contact 143 of the branch 118 is electrically coupled by a solder 114 to one end of a lead line 113 which extends at the other end to the armature coil 106. The branch 118 may have at distal end two sideward projections thereof for engagement with its two adjacent tooth portions 119 (or two coils 106 wound on their respective tooth portions 119) so that it can be prevented from slipping out of the slot.

The lead portion 142 of the flexible pc film 140 extends through an opening 144 provided in the housing 101 to the outside. Preferably, the lead portion 142 extending from the opening 144 is securely bonded by e.g. an adhesive to the outer surface of the housing 101.

Also, one or more magnets 145 are provided on the upper surface of the hub 107 of the fourth embodiment for magnetic clamping or holding an optical disk (not shown). The upper surface of the hub 107 has at rim edge an annular rib 146 for defining an optical disk loading area.

Accordingly, the fourth embodiment permits the land portion 141 (namely, its contacts 143) of the flexible pc film 140 to be disposed above the stator 104 (at the side opposite to the housing 101) and thus, during fabrication, the armature coil 106 of the stator 104 can be connected to the contacts 143 of the flexible pc film 140 with much ease while there is wide opened above the stator 104 (prior to mounting of the hub 107).

The other components and their arrangement of the fourth embodiment are similar to those of the second embodiment and will not further be explained.

It would be understood that the spindle motor according to the present invention is not limited to the foregoing embodiments. Various changes and modifications will be possible without departing the scope and spirit of the present invention.

We claim:

1. A spindle motor comprising a housing, a hub arranged for rotation on the housing, bearing means interposed between the housing and the hub, a rotor magnet mounted to the hub, a stator mounted to the housing so as to face the rotor magnet, and a flexible printed circuit film for supply of electric currents to an armature coil of the stator, the improvement characterized in which said flexible printed circuit film comprises a land portion coupled electrically to the armature coil of said stator and a lead portion extending from the land portion, said land portion being disposed above said stator and said lead portion extending between said stator and said housing to an outside of the housing.

2. A spindle motor according to claim 1, wherein said stator has a stator core formed of a plurality of core plates in layer arrangement and accompanied with the armature coil wound thereon, said stator core having an axially extending recess therein for allowing the lead portion of said flexible printed circuit film to extend therethrough towards and through to the outside of the housing.

3. A spindle motor according to claim 2, wherein the land portion of said flexible printed circuit film is belt-like in configuration and extends circumferentially above said stator.

4. A spindle motor according to claim 3, wherein said housing has at center a tubular support thereof and said hub has at center a shaft thereof, the shaft being rotatably supported by said bearing means fitted into the tubular support, and the land portion of said flexible printed circuit film is mounted to an outer side of the tubular support.

5. A spindle motor according to claim 2, wherein the land portion of said flexible printed circuit film extends radially of said stator.

6. A spindle motor according to claim 5, wherein the land portion of said flexible printed circuit film is disposed between an upper surface of said stator core and the armature coil so as to be securely held to the upper surface of said stator core.

7. A spindle motor comprising a housing, a hub arranged for rotation on the housing, bearing means interposed between the housing and the hub, a rotor magnet mounted to the hub, a stator mounted to the housing so as to face the rotor magnet, and a flexible printed circuit film for supply of electric currents to an armature coil of the stator, the improvement characterized in which said flexible printed circuit film comprises a land portion coupled electrically to the armature coil of said stator and a lead portion extending from the land portion, said land portion defining a plurality of branches outwardly extending from a distal end thereof, said branches extending upwardly through corresponding slots of said stator to project upwardly from the upper surface of the stator, and said branches being connected electrically to the armature coil of said stator.

8. A spindle motor according to claim 7, wherein the land portion of said flexible printed circuit film is divided at a distal end into three branches which are securely held in said corresponding slots of said stator.

* * * * *

UNITED STATES PATENT AND TRADEMARK OFFICE
CERTIFICATE OF CORRECTION

PATENT NO. : 5,256,922

DATED : October 26, 1993

INVENTOR(S) : Tadahiro Tanaka et al.

It is certified that error appears in the above-identified patent and that said Letters Patent is hereby corrected as shown below:

Title page, item [73], Assignee:

Please add the following Assignee--Nagano Nidec Corporation, Nagano-Ken, Japan--.

Signed and Sealed this

Nineteenth Day of July, 1994

Attest:

BRUCE LEHMAN

*Attesting Officer*  *Commissioner of Patents and Trademarks*